| (12) | United States Patent<br>Gamm et al. | (10) Patent No.: US 7,305,046 B2<br>(45) Date of Patent: Dec. 4, 2007 |
|---|---|---|

(54) I/Q MODULATOR WITH CARRIER PREDISTORTION

(75) Inventors: Eberhard Gamm, Erlangen (DE); Reiner Retkowski, Erlangen (DE); Gerald Ulbricht, Röthenbach (DE); Heinz Gerhaeuser, Waischenfeld (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 931 days.

(21) Appl. No.: 10/221,632

(22) PCT Filed: Mar. 2, 2001

(86) PCT No.: PCT/EP01/02390

§ 371 (c)(1),
(2), (4) Date: Nov. 6, 2002

(87) PCT Pub. No.: WO01/69880

PCT Pub. Date: Sep. 20, 2001

(65) Prior Publication Data

US 2004/0015246 A1   Jan. 22, 2004

(30) Foreign Application Priority Data

Mar. 15, 2000 (DE) .............................. 100 12 539

(51) Int. Cl.
*H04K 1/02* (2006.01)
(52) U.S. Cl. ...................... 375/296; 375/223; 375/271; 375/278; 375/284; 375/285; 375/302; 381/13; 398/193; 455/110; 455/114.3
(58) Field of Classification Search ................ 330/149; 455/126; 370/484; 375/296; 700/39
See application file for complete search history.

(56) References Cited

U.S. PATENT DOCUMENTS 4,884,265 A * 11/1989 Schroeder et al. .......... 370/484

(Continued)

FOREIGN PATENT DOCUMENTS

DE        3643689 A1    6/1988

(Continued)

OTHER PUBLICATIONS

M. Ghaderi, S. Kumar, D.E. Dodds; Adaptive Predistortion Lineariser Using Polynomial Functions; Apr. 1994; IEE Proceedings—Communications; vol. 141; pp. 49-55.*

(Continued)

*Primary Examiner*—David C. Payne
*Assistant Examiner*—Adolf DSouza
(74) *Attorney, Agent, or Firm*—Daniel J. Santos (57) ABSTRACT

An I/Q modulator used for processing an I/Q signal to obtain a predistorted output signal. The I/Q signal has an I component and a Q component, and comprises a predistorter for predistorting, with a predistortion signal, a carrier signal, which comprises a first subcomponent and a second subcomponent that is substantially orthogonal to the first subcomponent, to obtain first and second predistorted subcomponents of the carrier signal. The predistortion signal depends on the I and Q components. A first multiplier multiples the I component by the first predistorted subcomponent to obtain a multiplied I component. A second multiplier multiples the Q component by the second predistorted subcomponent to obtain a multiplied Q component. An adder adds the multiplied I component and the negative multiplied Q component to obtain the predistorted output signal. Thus, a simplification of the I/Q modulator and a reduction in the number of necessary multipliers is achieved.

11 Claims, 4 Drawing Sheets

U.S. PATENT DOCUMENTS

| | | | | |
|---|---|---|---|---|
| 5,049,832 A | | 9/1991 | Cavers | 330/149 |
| 5,252,930 A | * | 10/1993 | Blauvelt | 330/149 |
| 6,314,142 B1 | | 11/2001 | Perthold et al. | 375/296 |

FOREIGN PATENT DOCUMENTS

| | | |
|---|---|---|
| DE | 4302456 A1 | 8/1994 |
| DE | 19621388 C2 | 12/1997 |
| DE | 19832116 A1 | 1/2000 |
| WO | WO 00/31881 | 6/2000 |

OTHER PUBLICATIONS

J. Cavers; Amplifier Linearization Using a Digital Predistorter with Fast Adaptation and Low Memory Requirements; Nov. 1990; IEEE Transactions on Vehicular Technology, vol. 39; pp. 374-382.*

G. Yang, G. Vos, H. Cho; I/Q Modulator Image Rejection Through Predistortion; Apr. 28-May 1, 1996; Vehicular Technology Conference; pp. 1317-1320.*

Adaptive Predistortion Lineariser Using Polynomial Functions, Ghaderi, M., Kumar, S., Ph.D., Dodds, D.E., IEEE Proc.-Commun., vol. 141, No. 2, Apr. 1994, pp. 49-55.

* cited by examiner

I/Q MODULATOR WITH CARRIER PREDISTORTION

FIELD OF THE INVENTION

The present invention relates to an I/Q modulator with carrier predistortion.

BACKGROUND OF THE INVENTION AND PRIOR ART

Conventional I/Q modulators are used in transmitting means for carrier-frequency transmission systems, e.g. transmitters for digital broadcasting, and in base stations for mobile communications.

Figure 4:
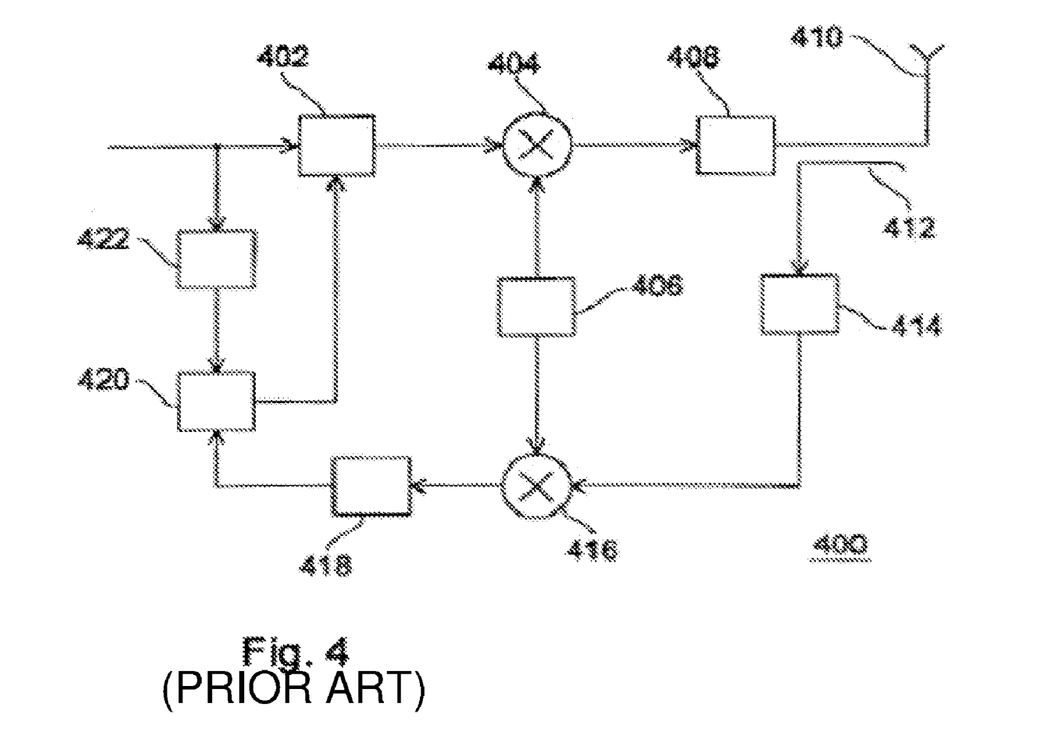
FIG. 4 shows a conventional transmitting means comprising an I/Q modulator with predistortion.

One example of such a transmitting means is shown in FIG. 4. The transmitting means 400 comprises an I/Q modulator 402 with predistortion, the I/Q modulator 402 comprising a first input connected to the input of the transmitting means 400, and an output. The first input of the I/Q modulator has an I/Q signal applied thereto. The output of the I/Q modulator is connected to a first input of a first mixer 404. A second input 404 of the mixer is connected to an oscillator 406. An output of the mixer 404 is connected to an input of an amplifier 408. An output of the amplifier 408 is connected to an antenna 410. The amplifier 408 and the antenna 410 have arranged between them a decoupling means 412 which is connected to an attenuator 414. An output of the attenuator 414 is connected to a first input of a second mixer 416. A second input of the second mixer 416 is also connected to the oscillator 406. An output of the mixer 416 is connected to an input of an I/Q demodulator 418. An output of the I/Q demodulator 418 is connected to a first input of a comparator 420. A second input of the comparator 420 is connected to an output of a delay element 422. An output of the comparator 420 is connected to a second input of the I/Q modulator 402. An input of the delay element 422 is connected to the first input of the I/Q modulator 402 and to the input of the transmitting means 400, respectively.

The decoupling means 412, the attenuator 414, the second mixer 416, the I/Q demodulator 418 and the comparator 420 define a feedback for determining the distortion parameters.

In the following, the mode of operation of the transmitting means according to FIG. 4 will be described briefly. An I/Q signal, which is e.g. a message-carrying baseband signal, is modulated onto a carrier signal by means of the I/Q modulator. In order to compensate e.g. distortions of the first mixer 404 and of the amplifier 408, the I/Q modulator additionally performs a predistortion of the I/Q signal. This is important especially when transmit signals with a non-constant envelope are used. Such a non-constant envelope occurs e.g. in cases in which amplitude-modulated instead of frequency-modulated signals are used so as to achieve a higher spectral efficiency of the modulation method. The non-constant envelope of the transmit signal causes in connection with the non-linearities of the first mixer 404 and of the amplifier 408 disturbances outside the useful frequency band. These disturbances are referred to as adjacent-channel emissions and should typically not exceed an application-specific limit value.

The predistorted output signal of the I/Q modulator 402 is fed to the first mixer 404 in which the signal is up-converted with the aid of the oscillator 406. The up-converted signal is then amplified by the amplifier, e.g. a travelling wave tube, and sent to the antenna 410 and transmitted.

Part of the signal sent to the antenna 410 is previously tapped off by the decoupling means 412 and, for further processing, it is attenuated by the attenuator 414 so as to reverse the amplification of the amplifier. The tapped-off attenuated signal is fed to the second mixer 416 for down-conversion, and the down-converted signal is then fed to the I/Q demodulator so as to be demodulated into an I/Q signal. The demodulated I/Q signal now carries the information on the distortion caused in the original I/Q signal e.g. by the first mixer 404 and the amplifier 408. When this I/Q signal is supplied to the comparator 420, the comparison between the original I/Q signal and the demodulated, distorted I/Q signal will provide an information indicating what predistortion of the I/Q modulator 402 has to be chosen so that the distortions caused by the first mixer 404 and the amplifier 408 can be compensated for in the best possible way.

A feature which is important to the comparison is that the original I/Q signal is delayed in time by the delay element 422 prior to the comparison in the comparator 420 so that the original I/Q signal is actually the signal which caused the predistorted I/Q signal. This method of adjusting the predistortion of the I/Q modulator 402 in dependence upon a comparison is referred to as adaptive predistortion.

An example of such an adaptive predistortion is described in U.S. Pat. No. 5,049,832. U.S. Pat. No. 5,049,832 discloses an amplifier linearization of an amplifier circuit by adaptive predistortion in the case of which an input signal for a power amplifier of the amplifier circuit is derived from an input modulation signal of the amplifier circuit by predistortion, i.e. the input signal of the power amplifier is predistorted so as to achieve a linear amplification of the input signal by the power amplifier.

The predistortion of the input modulation signal is adjusted via a table, which is addressed in dependence upon the square of the amplitude of the input modulation signal, the contents of the table being continuously updated so that variations of the distortion caused by the power amplifier can be taken into account during the predistortion caused by the I/Q modulator.

Figure 5:
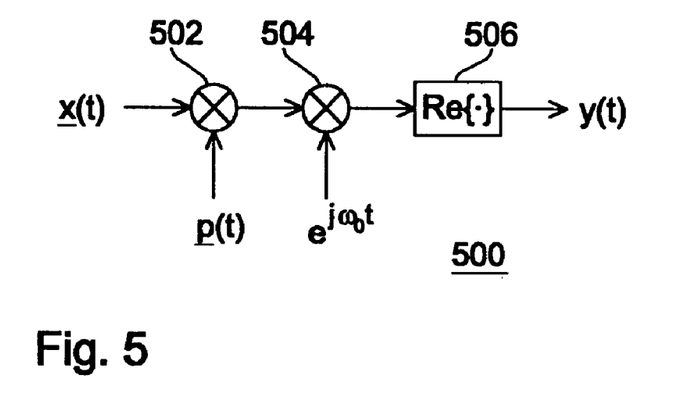
FIG. 5 shows a schematic representation of an I/Q modulator with predistortion of the I/Q signal.

In the following, a conventional I/Q modulator with predistortion will be described. Making use of signals which are represented as a complex function, FIG. 5 shows the principle of an I/Q modulator 500 with predistortion of the I/Q signal. The I/Q modulator 500 has a first multiplier 502 which is connected to a second multiplier 504. The second multiplier 504 is connected to an element 506 for forming the real component.

A first input of the first multiplier 502 has applied thereto a complex I/Q signal or a baseband signal comprising an I component and a Q component:

$$\underline{x}(t)=i(t)+jq(t) \qquad \text{equa. 1}$$

A second input of the first multiplier 502 has applied thereto a complex predistortion signal.

$$\underline{p}(t)=p_1(t)+jp_2(t) \qquad \text{equa. 2}$$

The multiplier 502 multiplies the I/Q signal by the predistortion signal and supplies at one output a predistorted I/Q signal.

$$\underline{x}_p(t)=\underline{x}(t)\cdot\underline{p}(t) \qquad \text{equa. 3}$$

The real component and the imaginary component of the predistorted I/Q signal have the following form:

$$i_p(t)=Re\{\underline{x}_p(t)\}=i(t)\cdot p_1(t)-q(t)\cdot p_2(t) \qquad \text{equa. 4}$$

$$q_p(t)=Im\{\underline{x}_p(t)\}=i(t)\cdot p_2(t)+q(t)\cdot p_1(t) \qquad \text{equa. 5}$$

The predistorted I/Q signal is fed to a first input of the second multiplier 504 and multiplied by a carrier signal applied to a second input, whereby it is applied to a carrier having an angular frequency $\omega_0$ so as to produce a complex output signal at an output of the second multiplier 504. The complex output signal is fed to the element 506 for forming the real component so as to supply a real output signal at one output of the element 506 for forming the real component.

$$y(t)=Re\{\underline{x}_p(t)\cdot e^{j\omega_0 t}\}=i_p(t)\cdot\cos\omega_0 t - q_p(t)\cdot\sin\omega_0 t \qquad \text{equa. 6}$$

As can be seen from equations 4 and 5, four multiplications, i.e. four multipliers in a circuit, are required for calculating the predistorted I/Q signal. In addition, two multiplications, i.e. two multipliers, are required for multiplying the carrier signal by the predistorted I/Q signal, as can be seen from equation 6. It follows that six multipliers are required for realizing in circuitry the I/Q modulator with predistortion of the I/Q signal according to FIG. 5.

Figure 6:
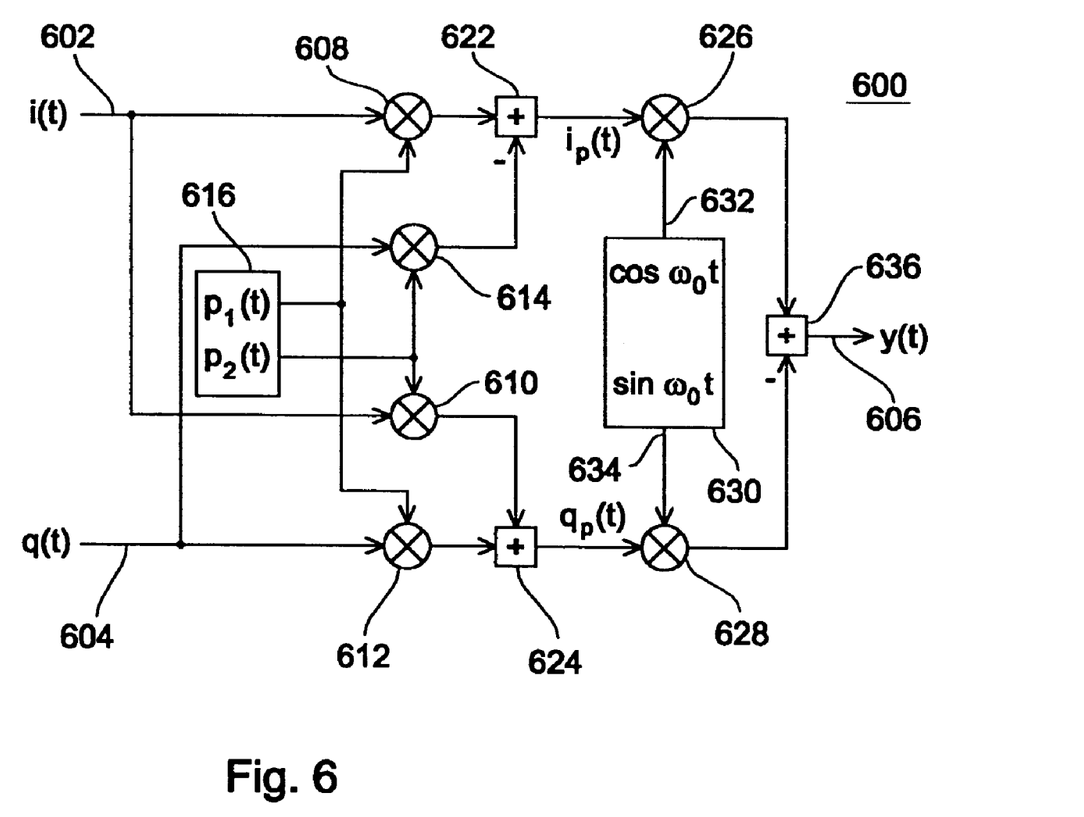
FIG. 6 shows a conventional I/Q modulator with predistortion of the I/Q signal.

FIG. 6 shows a conventional I/Q modulator 600 with predistortion of the I/Q signal or predistortion of the baseband signal. The I/Q modulator comprises a first input 602 and a second input 604 and an output 606. The first input 602 is connected to a first input of a first multiplier 608 and a first input of a second multiplier 610. The second input 604 of the I/Q modulator 600 is connected to a first input of a third multiplier 612 and a first input of a fourth multiplier 614. A second input of the first multiplier 608 and a second input of the third multiplier 612 are connected to a first output of a means 616 for producing a predistortion signal. A second input of the second multiplier 610 and a second input of the fourth multiplier 614 are connected to a second output 620 of the means 616 for producing a predistortion signal. An output of the first multiplier 608 is connected to a first input of a first adder 622. An output of the fourth multiplier 614 is connected to a second input of the first adder 622. An output of the second multiplier 610 is connected to a first input of a second adder 624 and an output of the third multiplier 612 is connected to a second input of the second adder 624.

An output of the first adder 622 is connected to a first input of a fifth multiplier 626, and an output of the second adder 624 is connected to a first input of a sixth multiplier 628. A second input of the fifth multiplier 626 is connected to a first output 632 of a means 630 for producing a carrier signal. A second input of the sixth multiplier 628 is connected to a second output 634 of the means 630 for producing a carrier signal.

An output of the fifth multiplier 626 is connected to a first input of a third adder 636. An output of the sixth multiplier 628 is connected to an inverting second input of the third adder 636. An output of the third adder 636 is connected to the output 606 of the I/Q modulator.

In the following, the mode of operation of the I/Q modulator 600 with predistortion of the I/Q signal according to FIG. 6 will be described briefly. The first input 602 of the I/Q modulator 600 has applied thereto the I component or real component of the I/Q signal, and the second input 604 of the I/Q modulator 600 has applied thereto the Q component or imaginary component of the I/Q signal.

The first output 618 of the means 616 for producing the predistortion signal has applied thereto the real component $p_1(t)$ of a predistortion signal $\underline{p}(t)$. The second output 620 of the means 616 for producing a predistortion signal $\underline{p}(t)$ has applied thereto the imaginary component $p_2(t)$ of the predistortion signal.

The first multiplier 608 performs the first multiplication according to equation 4. The fourth multiplier 614 performs the second multiplication according to equation 4. Furthermore, the first adder 622 forms the sum of equation 4 so as to obtain the real component $i_p(t)$ of the predistorted I/Q signal $\underline{x}_p(t)$. The second multiplier 610 performs the first multiplication according to equation 5. The third multiplier 612 performs the second multiplication according to equation 5. In addition, the second adder 624 forms the sum according to equation 5 so as to produce the imaginary component $q_p(t)$ of the predistorted I/Q signal $\underline{x}_p(t)$.

The first output 632 of the means 630 for producing a carrier signal has applied thereto a first subcomponent, here the real component of the carrier signal, which is e.g. a cos function. The second output 634 of the means 630 for producing the carrier signal has applied thereto a second subcomponent, here the imaginary component of the carrier signal, which is a subcomponent, e.g. a sin function, that is substantially orthogonal to the first subcomponent.

In addition, the fifth multiplier 626 performs the first multiplication according to equation 6, whereas the sixth multiplier 628 performs the second multiplication according to equation 6. Finally, the third adder 636 forms the difference according to equation 6 so as to produce the real output signal y(t) at the output 606 of the I/Q modulator.

In the case of modern transmitting means the predistortion and the I/Q modulation are carried out digitally. In view of the large bandwidth and the high precision demands of modern transmission methods, such as e.g. W-CDMA (W-CDMA=Wideband Code-Division Multiple Access), fast digital multipliers having a high resolution, typically 14 bits, are required for this purpose.

Figure 7:
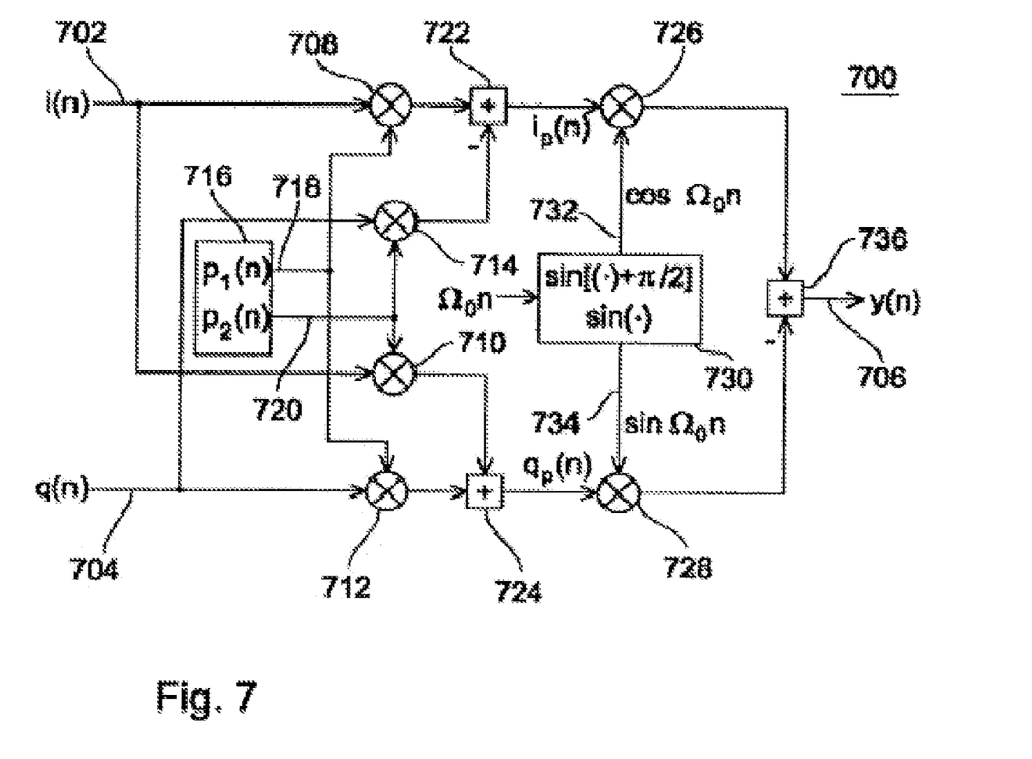
FIG. 7 shows a digital realization of the conventional I/Q modulator according to FIG. 6.

FIG. 7 shows a time-discrete i.e. digital realization of the conventional I/Q modulator with predistortion of the I/Q signal according to FIG. 6. The I/Q signal, the carrier signal, the predistortion signal and the output signal are represented by sampled values at intervals $T_A=1/f_A$. $f_A$ is the sampling rate, wherein $t=n\cdot T_A$ and $\Omega_0=\omega_0\cdot T_A$. n is the sampling parameter.

From equations 4, 5 and 6, it follows that:

$$i_p(n)=i(n)\cdot p_1(n)-q(n)\cdot p_2(n) \qquad \text{equa. 7}$$

$$q_p(n)=i(n)\cdot p_2(n)+q(n)\cdot p_1(n) \qquad \text{equa. 8}$$

$$y(n)=i_p(n)\cdot\cos\Omega_0 n - q_p(n)\cdot\sin\Omega_0 n \qquad \text{equa. 9}$$

Figure 8:
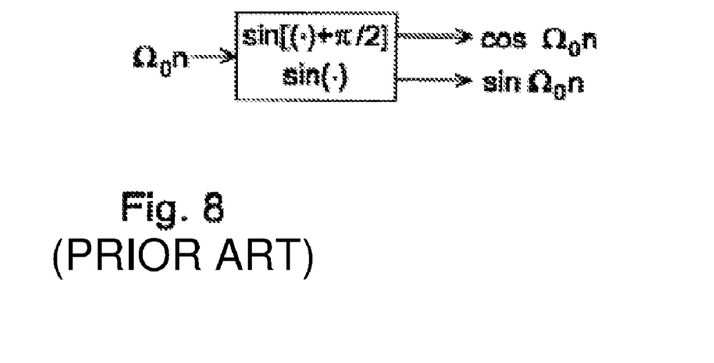
FIG. 8 shows a representation of a conventional numeric oscillator.

The means 730 for producing a carrier signal is now e.g. a numeric oscillator (NCO) of the type shown in FIG. 8. The numeric oscillator comprises a phase accumulator, which forms the phase $\Omega_0 n$, and a sine table which is addressed by the phase. The two orthogonal subcomponents of the carrier signal are supplied at the first output 732 and at the second output 734 of the means 730 for producing a carrier signal. The first subcomponent of the carrier signal is here the sin function from which the second subcomponent, the cos function, can easily be calculated in the numeric oscillator by shifting the phase by a quarter period $\pi/2$.

One disadvantage of the conventional digital I/Q modulator with predistortion of the I/Q signal is that six fast digital multipliers with high resolution are required for processing the I/Q signal.

As far as a realization is concerned, this means that a large number of gates will be necessary and that power consumption will be high.

DE 198 32 116 A 1 discloses a method of linearly predistorting a digitized signal, wherein the signal is to be transmitted with the aid of a multi-carrier method and wherein the carrier frequencies used in this multi-carrier method and forming the carrier spectrum are acted upon by correction values.

DE 196 21 388 C 2 discloses a method of predistorting a signal which is to be transmitted over a non-linear transmission path, and a circuit arrangement for executing this method. The envelope of a signal is detected, whereupon quantized envelope values are formed. Following this, complex predistortion coefficients are formed, which depend on the quantized envelope values and on a previously detected transfer function of the non-linear transfer path, whereupon the signals to be transmitted via the non-linear transmission path are subjected to complex weighting with the complex predistortion coefficients so that the distortion caused by the non-linear transmission path will be compensated for to a large extent with respect to magnitude and phase.

DE 36 43 689 A 1 discloses a method and an arrangement for digitally predistorting 16-QAM signals. For compensating transmission-dependent distortions of the digital quaternary baseband signals of a transmission executed by means of the 16-QAM method, the symbol pulse duration is subdivided into a number of n support points. An optimizing method provides the amplitude values of the support points which are adapted to the actual channel characteristics. The amplitude values are stored as coefficients in read-only memories and used for predistorting a transmit signal in an QAM modulator.

SUMMARY OF THE INVENTION

It is the object of the present invention to provide a simplified I/Q modulator and a simplified method of processing an I/Q signal.

In accordance with a first aspect of the present invention, this object is achieved by an I/Q modulator for processing an I/Q signal so as to obtain a predistorted output signal, said I/Q signal having an I component and a Q component, comprising: a predistorter for predistorting with a predistortion signal a carrier signal, which comprises a first subcomponent and a second subcomponent that is substantially orthogonal to said first subcomponent, so as to obtain a first and a second predistorted subcomponent of the carrier signal, said predistortion signal depending on the I component and the Q component; a first multiplier for multiplying the I component by the first predistorted subcomponent so as to obtain a multiplied I component; a second multiplier for multiplying the Q component by the second predistorted subcomponent so as to obtain a multiplied Q component; an adder for adding the multiplied I component and the negative multiplied Q component so as to obtain the predistorted output signal.

In accordance with a second aspect of the present invention, this object is achieved by A method of processing an I/Q signal so as to obtain a predistorted output signal, said I/Q signal having an I component and a Q component, said method comprising the following steps: predistorting with a predistortion signal a carrier signal, which comprises a first subcomponent and a second subcomponent that is substantially orthogonal to said first subcomponent, so as to obtain a first and a second predistorted subcomponent of the carrier signal, said predistortion signal depending on the I component and the Q component; multiplying the I component by the first predistorted subcomponent so as to obtain a multiplied I component; multiplying the Q component by the second predistorted subcomponent so as to obtain a multiplied Q component; and adding the multiplied I component and the negative multiplied Q component so as to obtain the predistorted output signal.

The invention is based on the finding that, by predistorting the carrier signal instead of the I/Q signal or the baseband signal, a substantial simplification of the structure of the I/Q modulator and a reduction of the number of multipliers of the I/Q modulator can be achieved.

BRIEF DESCRIPTION OF THE DRAWINGS

In the following, preferred embodiments of the present invention will be explained in detail making reference to the drawings enclosed, in which.

DETAILED DESCRIPTION OF PREFERRED EMBODIMENTS

Figure 1:
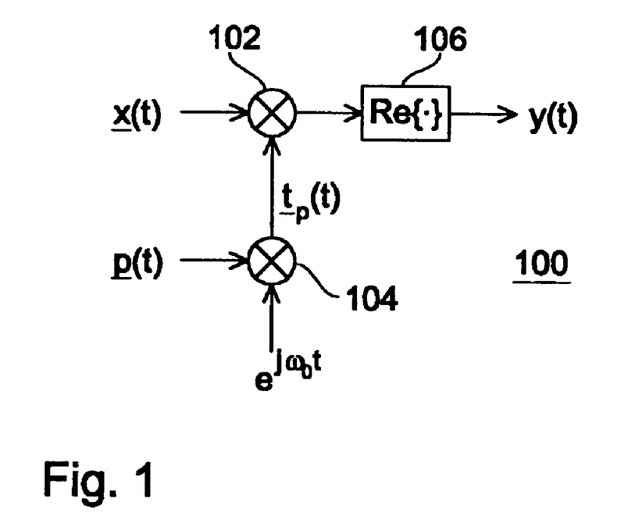
FIG. 1 shows a schematic representation of an I/Q modulator with predistortion of the carrier signal according to the present invention.

FIG. 1 shows a schematic representation of an I/Q modulator with predistortion of the carrier signal. The I/Q modulator 100 comprises a first multiplier 102 having a first input which has a complex I/Q signal $\underline{x}(t)$ applied thereto, a second input and an output, a second multiplier 104 having a first input which has a predistortion signal $\underline{p}(t)$ applied thereto, a second input which has a carrier signal applied thereto and an output connected to the second input of the first multiplier 102, and an element 106 for forming the real component having an input which is connected to the output of the first multiplier 102 and an output which supplies the output signal as a real signal y(t).

The second input of the second multiplier 104 has the complex carrier signal applied thereto.

$$e^{j\omega t}=\cos \omega_0 t+j \sin \omega_0 t \qquad \text{equa. 10}$$

This carrier signal is predistorted via the predistortion signal $$\underline{p}(t)=p_1(t)+jp_2(t) \qquad \text{equa. 11}$$

which is applied to the first input of the second multiplier 104 and which can additionally by represented as a polar function $$\underline{p}(t)=\rho(t)\cdot e^{j\phi(t)} \qquad \text{equa. 12}$$

so as to obtain a complex predistorted carrier signal $\underline{t}_p(t)$ at the output of the second multiplier 104.

$$\underline{t}_p(t)=\underline{p}(t)\cdot e^{j\omega t}=\rho(t)\cdot e^{j[\omega_0 t+\phi(t)]} \qquad \text{equa. 13}$$

This predistorted carrier signal is multiplied in the first multiplier 102 by the I/Q signal so as to produce the complex output signal at the output of the first multiplier 102. This complex output signal is fed to the element 106 for forming the real component so as to obtain the real output signal.

$$y(t) = \text{Re}\{x(t) \cdot t_p(t)\}$$
$$= i(t) \cdot \rho(t) \cdot \cos[\omega_0 t + \phi(t)] - q(t) \cdot \rho(t) \cdot \sin[\omega_0 t + \phi(t)]$$
equa. 14

As can be seen from equation 14, only four multiplications, i.e. four multipliers in the case of a realization in circuitry, are required for determining the output signal.

When the I/Q modulator 100 with predistortion of the carrier signal according to FIG. 1 is digitally realized, the signals are represented by sampled values at intervals $T_A=1/f_A$. $f_A$ is the sampling rate, wherein $t=n \cdot T_A$ and $\Omega_0=\omega_0 \cdot T_A$. n is the sampling parameter. From equation 14 the following is obtained for the output signal:

$$y(n)=i(n)\cdot\rho(n)\cdot\cos[\Omega_0 n+\phi(n)]-q(n)\cdot\rho(n)\cdot\sin[\Omega_0 n+\phi(n)]$$
equa. 15

With the aid of equations 13 and 14, this output signal can be represented as follows:

$$y(n)=i(n)\cdot\text{Re}\{t_p(n)\}-q(n)-\text{Im}\{t_p(n)\}$$
equa. 16

Figure 2:
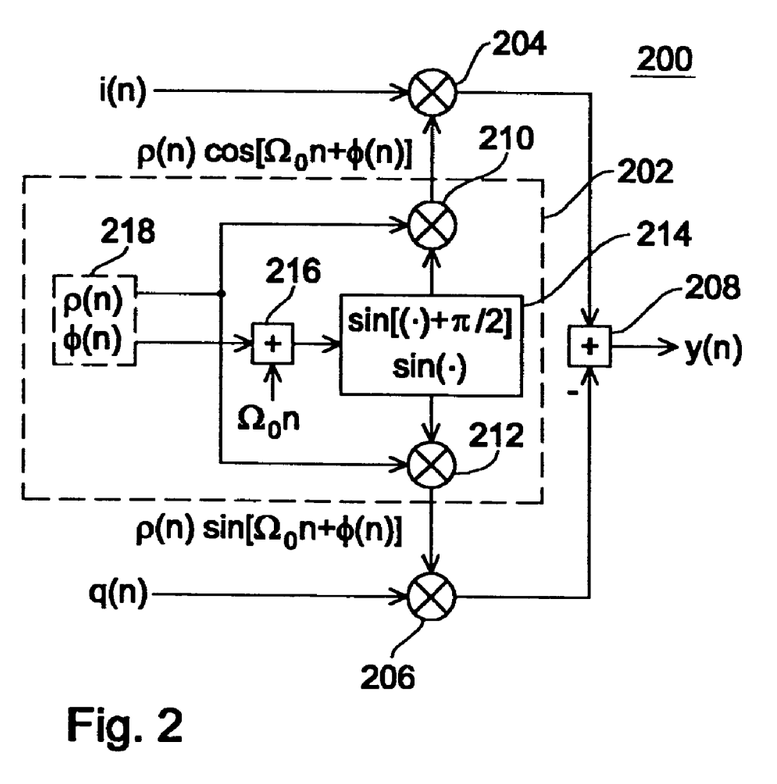
FIG. 2 shows a first embodiment of a digital I/Q modulator with predistortion of the carrier signal according to the present invention.

FIG. 2 shows a first embodiment of a digital I/Q modulator 200 with predistortion of a carrier signal according to the present invention. The I/Q modulator 200 comprises a predistortion means 202, a first multiplier 204 having a first input and a second input and an output, a second multiplier 206 having a first input and a second input and an output, and an adder 208 having a first input and an inverting second input. The first output of the predistortion means 202 is connected to the first input of the first multiplier 204. The second output of the predistortion means 202 is connected to the first input of the second multiplier 206. The second input of the first multiplier 204 is a first input of the I/Q modulator having the I component of the I/Q signal applied thereto. The second input of the second multiplier 206 is a second input of the I/Q modulator having the Q component of the Q signal applied thereto. The output of the first multiplier 204 is connected to the first input of the adder 208. The output of the second multiplier 206 is connected to the second input of the adder 208. The output of the adder 208 defines an output of the I/Q modulator 200 at which the output signal y(n) of the I/Q modulator 200 is supplied.

The first output of the predistortion means 202 has a first predistorted subcomponent of the carrier signal applied thereto. The second output of the predistortion means 202 has a second predistorted subcomponent of the carrier signal applied thereto. The first multiplier 204 performs the first multiplication of the first summand according to equation 15, whereas the second multiplier 206 performs the first multiplication of the second summand according to equation 15. The difference in equation 15 is formed by the adder 208 so as to produce the output signal of the I/Q modulator.

The predistortion means 202 of FIG. 2 comprises a first multiplier 210, a second multiplier 212, an oscillator 214 for producing the carrier signal, an adder 216, and a means 218 for producing the predistortion signal.

The first multiplier 210 of the predistortion means 202 comprises a first input connected to a first output of the oscillator 214, a second input connected to a first output of the means 218 for producing the predistortion signal, which has the amplitude $\rho(n)$ of the predistortion signal according to equation 12 applied thereto, and an output defining the first output of the predistortion means 202 and supplying the first predistorted subcomponent of the carrier signal. The second multiplier 212 of the predistortion means 202 comprises a first input connected to the second output of the oscillator 214, a second input connected to the first output of the means 218 for producing the predistortion signal, and an output defining the second output of the predistortion means 202 and supplying the second predistorted subcomponent of the carrier signal.

The adder 216 of the predistortion means 202 comprises a first input connected to a second output of the means 218 for producing the predistortion signal, which has the phase $\phi(n)$ of the predistortion signal according to equation 12 applied thereto, and a second input which has the phase $\Omega_0 n$ of the carrier signal applied thereto. An output of the adder 216 is connected to an input of the oscillator 214.

The adder 216 adds to the original phase $\Omega_0 n$ of the carrier signal the phase $\phi(n)$ of the predistortion signal, which is supplied at the second input of the means 218 for producing the predistortion signal. The phase of the predistortion signal is in this way taken into account in the phase of the carrier signal. The output of the adder 216 has then applied thereto a predistorted phase of the carrier signal and this predistorted phase is fed to the input of the oscillator 214. The oscillator 214, e.g. a numeric oscillator of the type shown in FIG. 8, takes this predistorted phase into account upon calculating the carrier signal, i.e. upon calculating the first subcomponent and the second subcomponent, e.g. the cos and sin components, of the carrier signal and supplies at the first and the second output thereof a first and a second phase-predistorted subcomponent of the carrier signal.

In the first multiplier 210 of the predistortion means 202, the first phase-predistorted subcomponent of the carrier signal, which is applied to the first input of the first multiplier 210, is multiplied by the amplitude $\rho(n)$ of the predistortion signal, which is applied to the second input of the first multiplier 210, so as to obtain at the output of the first multiplier 210 the first predistorted subcomponent of the carrier signal, said first predistorted subcomponent being the second factor of the first summand of equation 15.

In the second multiplier 212 of the predistortion means 202, the second phase-predistorted subcomponent of the carrier signal, which is applied to the first input of the second multiplier 212, is multiplied by the amplitude $\rho(n)$ of the predistortion signal, which is applied to the second input of the second multiplier 212, so as to obtain the second predistorted subcomponent of the carrier signal, said second predistorted subcomponent being the second factor of the second summand of equation 15.

The oscillator 214 may be a numeric oscillator, which may e.g. be a sin table addressed by a phase, i.e. here a predistorted phase $\Omega_0 n+\phi(n)$, so as to determine the values of the sin function and of the function which is orthogonal to this sin function, here the cos function. The oscillator 214 may be any other oscillator or numeric oscillator which supplies the values of a carrier signal consisting of a first subcomponent and of a second subcomponent that is essentially orthogonal thereto.

The means 218 for producing the predistortion signal may e.g. be a table which is addressed by the sampling parameter n and which supplies the amplitude $\rho(n)$ and the phase $\phi(n)$ of the predistortion signal. This table can additionally depend on the values of the I and Q components i(n), q(n) of the I/Q signal and also on optional parameters which describe the properties of e.g. a transmitting means, e.g. a transmitter amplifier, following the modulator, as shown in FIG. 4. Optional parameters are e.g. parameters taking into account the age of the transmitter amplifier, the temperature of the surroundings, power variations of the transmitter amplifier and of a system having the I/Q modulator installed therein.

The table can be a static table which reacts in a predetermined and unvarying way to specific signal values of the I and of the Q component of the I/Q signal and optional parameters, i.e. which has e.g. a fixed appearance and a fixed storage size and which supplies fixed values associated with certain conditions. The table may, however, also comprise variable or dynamic values or contents which, depending on the behaviour of e.g. the transmitter amplifier in response to e.g. environmental conditions, are adaptively adjusted and updated, respectively. A static table will, typically, be much larger than a dynamically varying table in which variations of the transmitting means are automatically taken into account e.g. through a feedback path of the type shown in FIG. 4. It follows that the dynamic table does not need any previous knowledge of the system in question, which has the I/Q modulator installed therein, and can therefore be smaller.

One disadvantage of a dynamic adaptive predistortion is, however, the high expenditure for a necessary feedback, as shown in FIG. 4, which should operate with high accuracy and with little distortion. Hence, a possible compromise is a static table which takes into account only the values of the I and Q components and a few optional parameters, typically the ambient temperature of the system having the I/Q modulator installed therein. Such a table can be realized with less expenditure.

Figure 3:
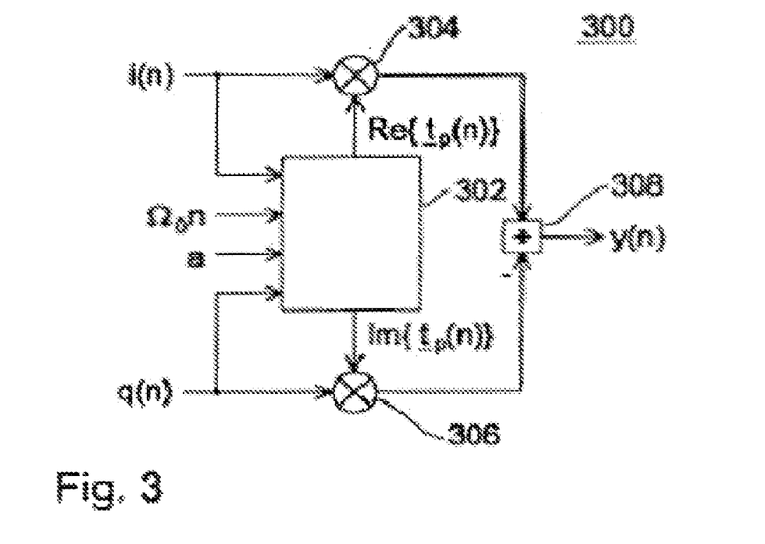
FIG. 3 shows a second embodiment of a digital I/Q modulator with predistortion of the carrier signal according to the present invention.

FIG. 3 shows a second embodiment of a digital I/Q modulator 300 with predistortion of the carrier signal according to the present invention. The predistortion means is now a predistortion means 302 consisting in its entirety of a table, since all the functions of the predistortion means 202 of FIG. 2 can be integrated in a table, which is addressable at least by the sampling parameter n and the phase $\Omega_0 n$.

The advantage is to be seen in the fact that only two multipliers are required for realizing the digital I/Q modulator with predistortion; this corresponds to one third of the number of multipliers of the conventional I/Q modulator according to FIG. 7. In addition, the I/Q modulator 300 comprises, similar to FIG. 2, a first multiplier 304, a second multiplier 306 and an adder 308, which have a function identical to that of the first multiplier 204, the second multiplier 206 and the adder 208 of FIG. 2.

In FIG. 3, it is shown that the predistortion means 302, here a table, can be addressed not only by the phase $\Omega_0 n$ but also by the I component and the Q component of the I/Q signal as well as by optional parameters a. This takes into account, on the one hand, the dependence of the predistortion on the amplitude of the I/Q signal or the amplitudes of the subcomponents of this I/Q signal and, on the other hand, the dependence of the predistortion on optional parameters, e.g. of a transmitter amplifier, as can be seen in FIG. 4, these optional parameters indicating e.g. the ageing of the transmitter amplifier, the temperature of the surroundings in which the I/Q modulator is installed, power variations of the transmitter amplifier and other conditions. The predistortion signal and the table, respectively, can be described by the following equation:

$$t_p(n) = p(n) \cdot e^{j\Omega_0 n} = p[x(n), a] \cdot e^{j\omega_0 n} = t_p[i(n), q(n), a, \Omega_0 n] \quad \text{equa. 17}$$

In FIG. 3 the table is shown as a static table in which specific states of the system, which has the I/Q modulator integrated therein, are taken into account. The table can, however, also be used for an adaptive predistortion of the I/Q signal by dynamically varying e.g. the contents of the table on the basis of a comparison between the original I/Q signal and the I/Q signal which has actually passed through a transmitting means, as shown e.g. in FIG. 4. This makes the table dependent e.g. only on the amplitude of the I/Q signal, i.e. only a small table will be necessary. If a large number of parameters is taken into account in a static table, a very large table will, however, be necessary.

The advantage of a static table, however, resides in the fact that, in comparison with a complicated feedback path of the type shown in FIG. 4, which should operate with high accuracy, i.e. which should e.g. not distort the signal, high costs are avoided.

The present invention realizes an I/Q modulator with predistortion of the carrier signal, which has a substantially simplified configuration in comparison with a conventional I/Q modulator with predistortion of the I/Q signal or of the baseband signal, i.e. which comprises only up to one third of the number of multipliers; hence, it will comprise a smaller number of gates and consume less power.

The invention claimed is:

1. An I/Q modulator for processing an I/Q signal so as to obtain a predistorted output signal, said I/Q signal having an I component and a Q component, comprising:

a predistorter for predistorting, with a predistortion signal, a carrier signal having an angular frequency, the carrier signal comprising a first subcomponent having the angular frequency and a second subcomponent having the angular frequency, the second subcomponent being substantially orthogonal to said first subcomponent, so as to obtain a first and a second predistorted subcomponent of the carrier signal, said predistortion signal depending on the I component and the Q component;

a first multiplier for multiplying the I component by the first predistorted subcomponent so as to obtain a multiplied I component;

a second multiplier for multiplying the Q component by the second predistorted subcomponent so as to obtain a multiplied Q component;

an adder for adding the multiplied I component and the negative multiplied Q component so as to obtain the predistorted output signal.

2. An I/Q modulator according to claim 1, wherein the predistorter comprises:

a means for producing the predistortion signal which supplies the magnitude of the predistortion signal and the phase of the predistortion signal;

an oscillator for producing the carrier signal, which comprises an input having the phase of the carrier signal applied thereto, a first output supplying the first subcomponent of the carrier signal, and a second output supplying the second subcomponent of the carrier signal;

an adder for adding the phase of the predistortion signal to an original phase of the carrier signal so as to determine the phase of the predistorted carrier signal;

a first multiplier for multiplying the magnitude of the predistortion signal by the first subcomponent of the carrier signal so as to produce the first predistorted subcomponent of the carrier signal; and a second multiplier for multiplying the magnitude of the predistortion signal by the second subcomponent of the carrier signal so as to produce the second predistorted subcomponent of the carrier signal.

3. An I/Q modulator according to claim 1, wherein the I/Q signal, the carrier signal and the predistortion signal are time-discrete signals which are each a function of a sampling parameter.

4. An I/Q modulator according to claim 3, wherein the oscillator is a numeric oscillator comprising:
a table for supplying the values of the first subcomponent and of the second subcomponent of the carrier signal in dependence upon the phase of the carrier signal.

5. An I/Q modulator according to claim 3, wherein the predistorter is a table for supplying the first and second predistorted subcomponents of the carrier signal in dependence upon at least the I component and the Q component of the I/Q signal and the phase of the carrier signal.

6. An I/Q modulator according to claim 5, wherein the values of the first and second predistorted subcomponents of the carrier signal in said table depend on at least one additional parameter.

7. An I/Q modulator according to claim 6, wherein the output signal of the I/Q modulator passes a distorting means following said I/Q modulator, and wherein the at least one additional parameter describes properties which contribute to the distortion of the I/Q signal in the distorting means.

8. An I/Q modulator according to claim 7, wherein the at least one parameter describes the temperature-dependent or the age-dependent properties of a distorting means or the properties of a distorting means which depend on power variations.

9. An I/Q modulator according to claim 7, wherein the distorting means is a transmitting means including a distorting transmitter amplifier.

10. An I/Q modulator according to claim 1, wherein the I/Q signal fed to the I/Q modulator or the predistorted I/Q signal coming from the I/Q modulator is compared with the aid of a comparison means with an output signal of the distorting means fed with the predistorted output signal of the I/Q modulator, so as to adjust the predistortion signal of the predistorter of the I/Q modulator in such a way that the distortion caused in the I/Q signal by the distorting means is compensated for.

11. A method of processing an I/Q signal so as to obtain a predistorted output signal, said I/Q signal having an I component and a Q component, said method comprising:
predistorting, with a predistortion signal, a carrier signal having an angular frequency, the carrier signal comprising a first subcomponent having the angular frequency and a second subcomponent having the angular frequency, the second subcomponent being substantially orthogonal to said first subcomponent, so as to obtain a first and a second predistorted subcomponent of the carrier signal, said predistortion signal depending on the I component and the Q component;
multiplying the I component by the first predistorted subcomponent so as to obtain a multiplied I component;
multiplying the Q component by the second predistorted subcomponent so as to obtain a multiplied Q component; and
adding the multiplied I component and the negative multiplied Q component so as to obtain the predistorted output signal.

* * * * *